United States Patent
Lindblad (10) Patent No.: US 9,820,571 B2
(45) Date of Patent: Nov. 21, 2017

(54) LIFT STAND WITH ARMS

(71) Applicant: Ergotron, Inc., St. Paul, MN (US)

(72) Inventor: Shaun C. Lindblad, Lino Lakes, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 14/661,622

(22) Filed: Mar. 18, 2015

(65) Prior Publication Data

US 2015/0265048 A1  Sep. 24, 2015

Related U.S. Application Data (60) Provisional application No. 61/955,479, filed on Mar. 19, 2014.

(51) Int. Cl.
| | |
|---|---|
| *F16M 11/00* | (2006.01) |
| *A47B 81/06* | (2006.01) |
| *F16M 11/10* | (2006.01) |
| *F16M 11/20* | (2006.01) |
| *F16M 11/04* | (2006.01) |

(52) U.S. Cl.
CPC .......... *A47B 81/064* (2013.01); *A47B 81/062* (2013.01); *F16M 11/046* (2013.01); *F16M 11/048* (2013.01); *F16M 11/10* (2013.01); *F16M 11/2021* (2013.01); *F16M 2200/041* (2013.01); *F16M 2200/063* (2013.01); *F16M 2200/08* (2013.01)

(58) Field of Classification Search
CPC ........ F16M 11/10; F16M 13/02; F16M 11/04; F16M 11/24; F16M 11/2092; F16M 11/2014; F16M 2200/044; F16M 11/2021; F16M 11/12; F16M 2200/063; F16M 13/022; F16M 2200/041; F16M 11/08; F16M 13/00
USPC ....... 248/276.1, 284.1, 286.1, 291.1, 292.13, 248/371, 917, 919, 921, 922, 923
See application file for complete search history.

(56) References Cited

U.S. PATENT DOCUMENTS

| | | |
|---|---|---|
| 6,695,274 B1 | 2/2004 | Chiu et al. |
| 6,822,857 B2 | 11/2004 | Jung et al. |
| 7,061,753 B2 | 6/2006 | Michoux et al. |
| 7,198,237 B2 | 4/2007 | Cho et al. |
| 7,252,277 B2 | 8/2007 | Sweere et al. |
| 7,336,479 B2 | 2/2008 | Liu et al. |
| 7,497,408 B2 | 3/2009 | Lim et al. |
| 7,597,302 B2 | 10/2009 | Lee et al. |
| 7,770,856 B2 | 8/2010 | Depay |

(Continued)

OTHER PUBLICATIONS

"International Application Serial No. PCT/US2015/021196, International Search Report dated Jul. 23, 2015", 4 pgs.

(Continued)

*Primary Examiner* — Steven Marsh
(74) *Attorney, Agent, or Firm* — Schwegman Lundberg & Woessner, P.A.

(57) ABSTRACT

A lift system including a bracket configured to support an object, a support having a first end and a second end, the first end being movably engaged to the bracket, at least one cam engaged to the second end of the support, and a base including a cam follower configured to engage the at least one cam, and at least one bias element having a first end and a second end, the first end engaged to the cam follower.

14 Claims, 9 Drawing Sheets

(56) References Cited

U.S. PATENT DOCUMENTS

| | | | | |
|---|---|---|---|---|
| 7,828,255 B2* | 11/2010 | Yen | ........................ | F16M 11/04 248/123.11 |
| 7,967,273 B2* | 6/2011 | Zhou | ...................... | F16M 11/04 248/176.3 |
| 7,971,834 B2 | 7/2011 | Wang et al. | | |
| 8,011,632 B2* | 9/2011 | Wang | ..................... | F16M 11/04 248/284.1 |
| 8,020,826 B2* | 9/2011 | Zhou | ...................... | F16M 11/10 248/317 |
| 8,763,969 B2* | 7/2014 | Wu | ........................ | F16M 11/10 248/123.11 |
| 8,967,569 B2* | 3/2015 | Hsu | ........................ | F16M 11/10 16/233 |
| 2004/0245419 A1 | 12/2004 | Sweere et al. | | |
| 2013/0112818 A1 | 5/2013 | Hsu | | |

OTHER PUBLICATIONS

"International Application Serial No. PCT/US2015/021196, Written Opinion dated Jul. 23, 2015", 6 pgs.

\* cited by examiner

LIFT STAND WITH ARMS

This application claims the benefit of U.S. Provisional Patent Application No. 61/955,479, titled "LIFT STAND WITH ARMS", to Shaun C. Lindblad, and filed on Mar. 19, 2014, the entire content of which being incorporated herein by reference.

TECHNICAL FIELD

In general, this disclosure is directed to techniques for supporting an object.

BACKGROUND

There are many applications in which lifts, arms, counterbalances, and force and torque providing mechanisms may be useful. Mechanisms such as these can be used to raise and lower a variety of items including, but not limited to, electronic displays, furniture work surfaces, production assembly tools, work load transfer equipment, kitchen cabinets, vertically oriented exercise equipment, robot control devices, etc.

There is a need for a support are that is less costly to manufacture and maintain, has increased reliability, allows easy adjustability, is scalable to many different sized loads, is adaptable to provide a long range of travel, and is adaptable to provide constant support force as the load is being positioned.

SUMMARY

In an example, this disclosure is directed to a lift system comprising a bracket configured to support an object; a support having a first end and a second end, the first end being movably engaged to the bracket; at least one cam engaged to the second end of the support; and a base including: a cam follower configured to engage the at least one cam; and at least one bias element having a first end and a second end, the first end engaged to the cam follower.

In an example, this disclosure is directed to a lift system comprising a bracket configured to support an object; a support having a first end and a second end, the first end being movably engaged to the bracket; a first cam and a second cam, the first and second cams engaged to the second end of the support; and a base including: a first cam follower configured to engage the first cam; a second cam follower configured to engage the second cam; at least one first bias element having a first end and a second end, the first end engaged to the first cam follower; and at least one second bias element having a first end and a second end, the first end engaged to the second cam follower.

In an example, this disclosure is directed to a lift system comprising a bracket configured to support an object; a four-bar arm mechanism having a first end and a second end, the first end being movably engaged to the bracket; a first cam and a second cam, the first and second cams engaged to the second end of the four-bar arm mechanism; and a base including: a first cam follower configured to engage the first cam; a second cam follower configured to engage the second cam; a first holder configured to support the first cam follower; a second holder configured to support the second cam follower; a first plurality of springs, the first plurality of springs having a first end and second end, the first end engaged to the first holder; a second plurality of springs, the second plurality of springs having a first end and second end, the first end engaged to the second holder; a bias element holding bracket configured to engage the second end of the first plurality of spring and the second end of the second plurality of springs; and an adjustment element configured to engage the bias element holding bracket.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following detailed description includes reference to the accompanying drawings, which form a part of the detailed description. The drawings show by way of illustration, specific embodiments in which the invention may be practiced. These embodiments are also referred to in this specification as "examples." The embodiments may be combined in various permutations or combinations, other embodiments may be used, or structural, logical and electrical changes may be made without departing from the scope of the present invention. The following detailed description is, therefore, not to be taken in a limiting sense, and the scope of the present invention is defined by the appended claims and any equivalents to which such claims are legally entitled.

This disclosure generally describes techniques for supporting an object, e.g., an electronic display, on a work surface. More particularly, this disclosure describes a lift system that can include a support and one or more cams, and a base, where the base includes one or more cam followers and one or more bias elements. As the support is lowered, the bias element can push the cam follower against the cam attached to the support, which, in turn, can provide torque balance. As the cam profile changes (the surface of the cam has a variable radius), the lift system provides a substantially constant torque balance.

Figure 1:
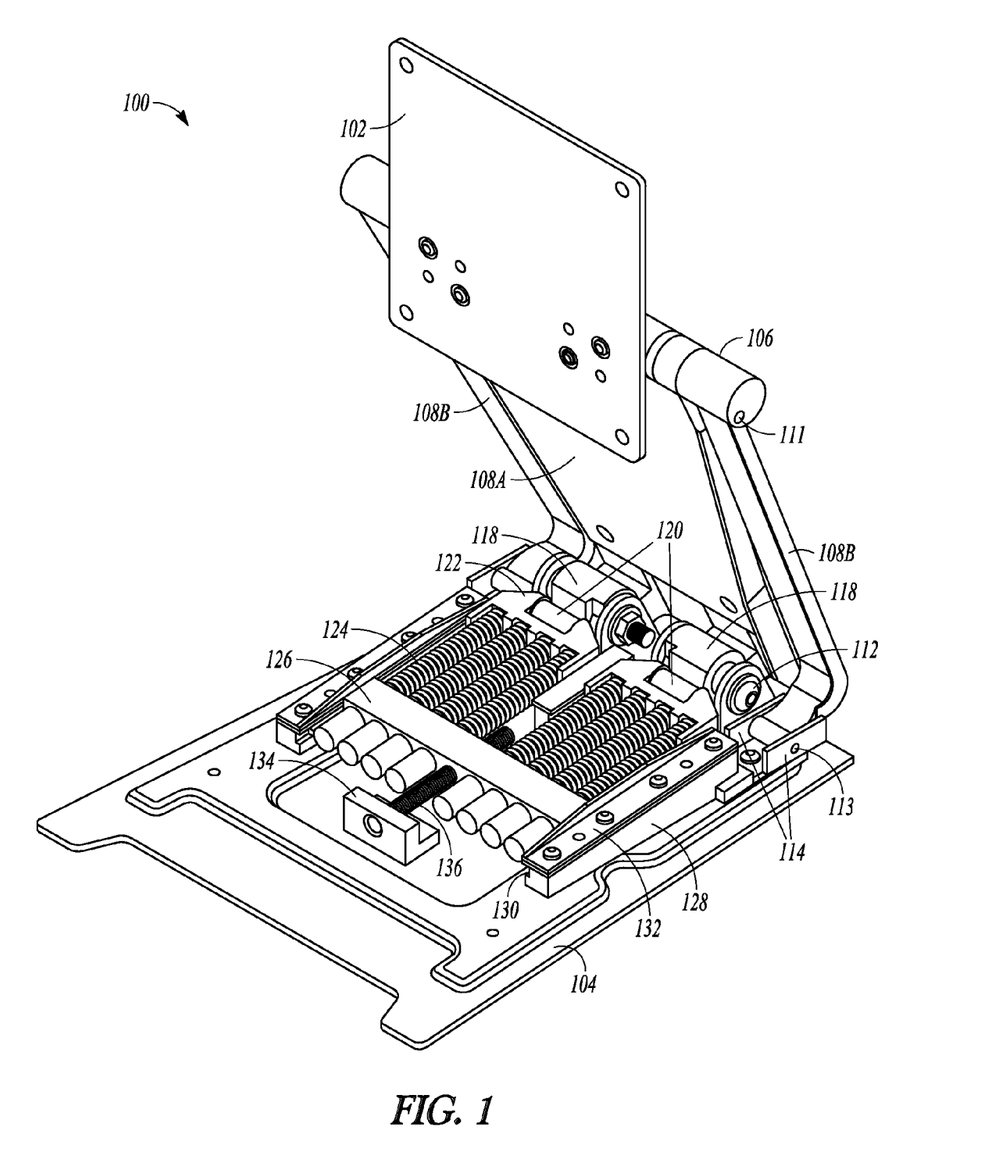
FIG. 1 is a perspective view of a lift stand with arms in a raised position, according to an embodiment of the invention.

FIG. 1 shows a perspective view of the lift stand 100 with the internal mechanism displayed. The lift stand 100 can support an object (not shown). The object can be adjusted to various height positions with little effort from a user and can maintain that position without further action by the user. In some examples, the object can be a display, including for example, a computer display, television monitor, or other display. The lift stand 100 can include a display mounting bracket 102 and a base member 104. The display mounting bracket 102 is coupled to a linkage 106. The lift stand 100 further includes an upper arm 108a and a lower arm 108b (collectively referred to in this disclosure as "arms 108") extending between the linkage 106 and the base member 104. Each arm 108 is coupled to the base member 104 at one end and the linkage 106 at the other. In an example, the arm 108 can be hingedly coupled to the base member 104 and the linkage 106.

Each of the two or more arms 108 is coupled to the linkage 106 by a linkage hinge (e.g., a lower linkage hinge 111) or otherwise articulated joint. The linkage 106 can include a passage aligned within the linkage 106. A bolt or pin can be positioned within the passage of the linkage 106 and a similar passage within a first end of an arm 108. The bolt or pin can be fastened or retained to one of the linkage 106 or an arm 108. In an example, the linkage hinge (e.g., lower linkage hinge 111) can be a pin retained with an R-clip, a press-fit hinge pin, or threaded fastener.

Similarly, each arm 108 is coupled to the base 104 by a base hinge (e.g., upper base hinge 112 or lower base hinge 113) or otherwise articulated joint. The base 104 can include one or more base hinge brackets 114 attached to the base 104, such as by welding or by one or more fasteners. The base hinge bracket 114 can include a passage aligned therein. A bolt can be positioned within the passage and a similar passage within a second end of the arm 108. In an example, the base hinge (e.g., upper base hinge 112 or lower base hinge 113) can be a pin retained within the passage of the arm 108 and the base hinge bracket 114 with an R-clip, a press-fit hinge pin, or threaded fastener. The size and shape of the arms 108 can be configured, such as to provide the maximum desired height of the lift stand 100 or to support the weight of the display attached to the display mounting bracket 102. The arms 108, linkage 106, and base hinge brackets 114 can be collectively referred to in this disclosure as a four-bar arm mechanism.

The base 104 can be configured to rest on or be affixed to a work surface, such as a desk, counter, or other horizontal or angled surface. The base 104 can have a length and width configured to support the weight of the lift stand 100 and the display apparatus attached thereto, such as to prevent the lift stand 100 from tipping if the lift stand 100 is accidently bumped or the user is adjusting the position of the lift stand 100. In an example, the base 104 can be fabricated from sheet metal. The sheet metal can be stamped or formed, such as to apply ridges to increase the rigidity of the base 104. The base 104 can include holes, brackets, channels, or adhesive patches for affixing the base 104 to a surface. Other mounting holes, brackets, or fastening means can be included on the base 104 for attaching a decorative skin or cover to the lift stand 100.

The lift stand 100 can include a display bracket 102 for fastening a display apparatus to the lift stand 100. The display bracket 102 can be a structure (e.g., a plate) configured with mounting features, such as holes, slots, channels, magnets, adhesive patches, or other features for fastening a display thereto. In an example, the display apparatus can be fastened to the display bracket 102 with bolts or threaded fasteners. The display bracket 102 can be sized and shaped to mate with mounting features on the display apparatus.

The one or more arms 108 can include one or more cam surfaces 118 (also referred to as "cams" in this disclosure) that rotate around a base hinge, such as an upper base hinge 112. The one or more cam surfaces 118 can be incorporated or otherwise integrated into the one or more arms 108. Additionally or alternatively, the cam surface 118 can be configured as an independent component affixed to the one or more arms 108 (e.g., upper arm 108a as shown).

The cam surface 118 can be configured to have a variable radius profile. A cam follower 120 can engage the cam surface 118. The cam follower 120 can be a roller bearing or circular surface for engaging with the cam surface 118, such as with low friction. In an example, the cam surface 118 or cam follower 120 can have mating surfaces with high polish. The cam surface 118 or cam follower 120 can be made of materials with high hardness (e.g., stainless steel, high carbon steel, etc.) or other suitable materials for supporting the force applied by the weight of the display to the cam surface 118 or cam follower 120 surface.

The cam follower 120 can be supported by a cam follower holding bracket 122. The cam follower holding bracket 122 can be coupled to one or more bias elements 124. The bias elements 124 can be captured or otherwise positioned between the cam follower holding bracket 122 and a bias element holding bracket 126. The bias elements 124 can be oriented in a position that is substantially parallel to the base 104, such as to minimize the height of the bias element 124 with respect to the base 104. The bias elements 124 can be, for example, compression springs, elastomeric elements, pneumatic cylinders, or other type of element that can apply force to the cam follower 120. A rod can be supported within the bias elements 124 holding bracket 126 and the cam follower holding bracket 122, such as to extend longitudinally through the center of the one or more bias elements 124, such as to maintain the position of the bias element 124 between the bias element holding bracket 126 and the cam follower holding bracket 122.

The base 104 can include one or more bias element guides 128. The guides 128 can be fixably attached to the base 104, such as by welding or fastening with bolts or screws. The guides 128 can be configured to align the translation of the cam follower holding bracket 122, such as in a trajectory towards or away from the cam surface 118. The orientation of the one or more arms 108 can rotate the cam surface 118, such as to displace the cam follower 120 along the guides 128 in a direction towards or away from the cam surface 118. The one or more guides 128 can retain the cam follower 120, cam follower holding bracket 122, bias element 124, and bias element holding bracket 126 to the base 104. The one or more guides 128 can include a slot 130 that engages with the bias element holding bracket 126 or the cam follower holding bracket 122. The cam follower holding bracket 122 or the bias element holding bracket 126 can translate within the slot 130 of the guide 128. The slot 130 can be included in the one or more guides 128 using various techniques, such as machined into the one or more guides 128, or by attaching a guide bracket 132 on the guide 128 to form a slot 130 between the guide 128 and the guide bracket 132. The guide bracket 132 can be attached to the guide 128 by adhesive, bolts, screws, or other fastening means. In an example, the one or more guides 128 can be integrated into the base 104, such as the base 104 having features formed therein to provide some or all of the features of the one or more guides 128.

The base 104 can include a mounting bracket 134. The mounting bracket 134 can be adjustably coupled to the bias element holding bracket 126 by an adjustment element 136. The adjustment element 136 can be any mechanism for altering the position of the bias element holding bracket 126 with respect to the mounting bracket 134, such as a set screw, a pin and socket, or a pneumatic cylinder with a pressure adjustment valve. Altering the position of the bias element holding bracket 126 can increase or decrease the biasing force of the bias elements 124, e.g., increase or decrease the compressive force of a spring.

The various components of the lift stand 100 can be collectively or independently cast, extruded, or formed from various materials, such as aluminum, steel, wood, plastic, composite, or other material suitable for the intended function of each component.

Decorative skins (or covers) can be included on the lift stand 100, such as to cover the arms 108, linkage 106, cam surface 118, cam follower 120, cam follower holding bracket 122, bias element 124, bias element holding bracket 126, bias element guide 128, guide bracket 132, and base 104.

The lift stand 100 can be configured to have a raised position, such as the position of the display is elevated at a furthest allowable limit from the base 104. The lift stand 100 can be configured to have a lowered position, such as at a lowest height limit from the base 104. Additionally or alternatively, the lift stand 100 can be positioned at an infinite number of heights between the raised position and the lowered position.

Figure 2:
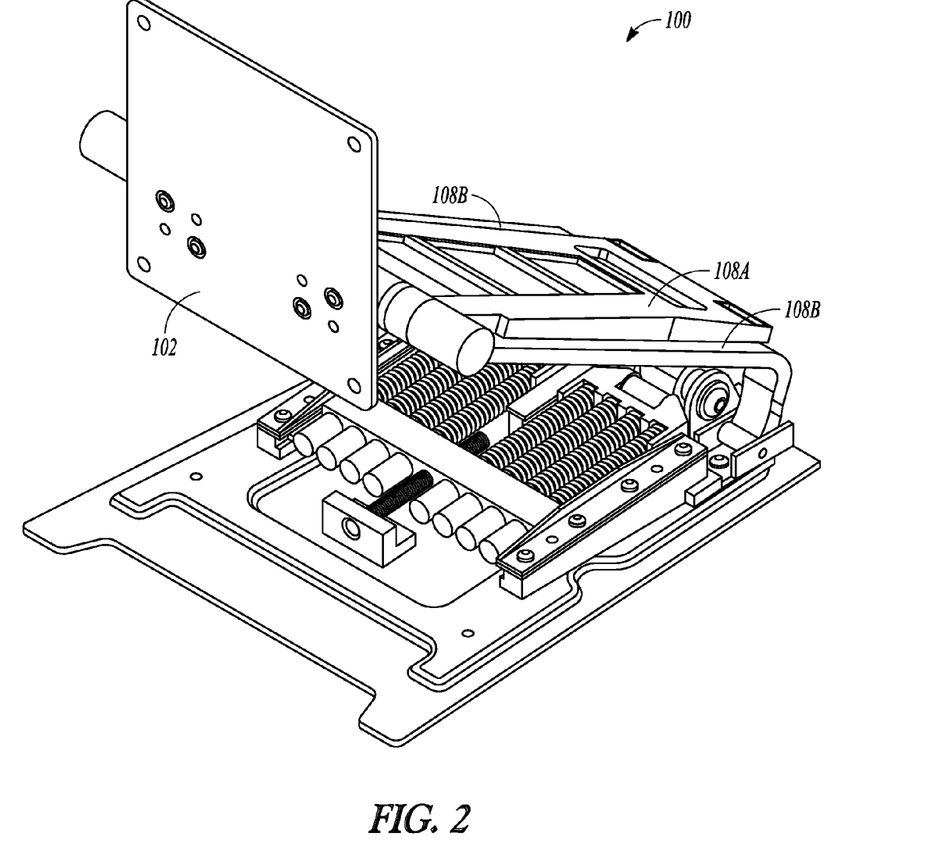
FIG. 2 is a perspective view of a lift stand with arms in a lowered position, according to an embodiment of the invention.

FIG. 2 is a perspective view of a lift stand 100 with the arms 108 in a lowered position, according to an embodiment of the invention. The arms 108 can be shaped to avoid interfering with other components of the lift stand 100, such as a curved shape as shown in FIG. 2. The curved shape can be configured to avoid interference with other components for all height positions of the lift stand 100.

Figure 3:
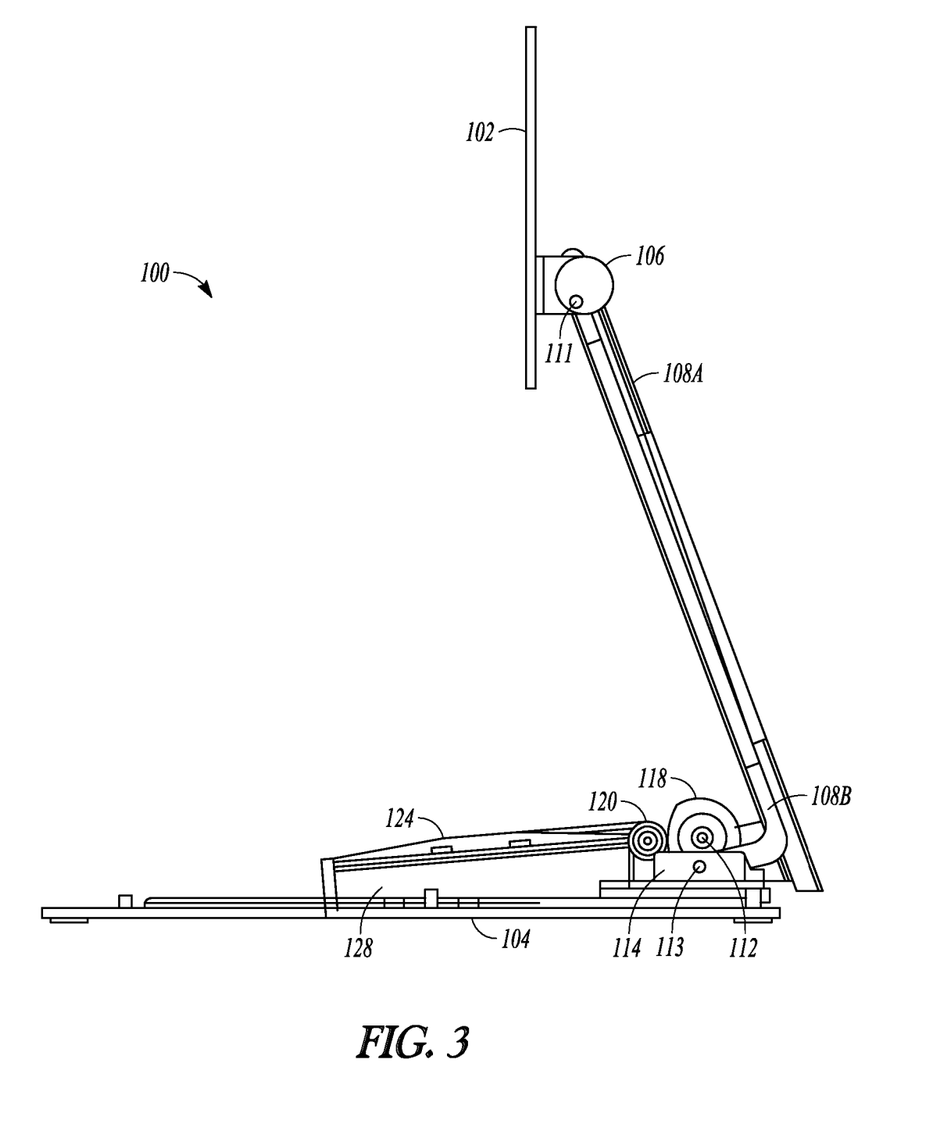
FIG. 3 is a side view of a lift stand with arms in a raised position, according to an embodiment of the invention.

FIG. 3 is a side view of a lift stand 100 with arms 108 in a raised position, according to an embodiment of the invention. As shown in FIG. 3, the decorative skins (or covers) of the lift stand 100 are removed to display the internal mechanism.

Figure 4:
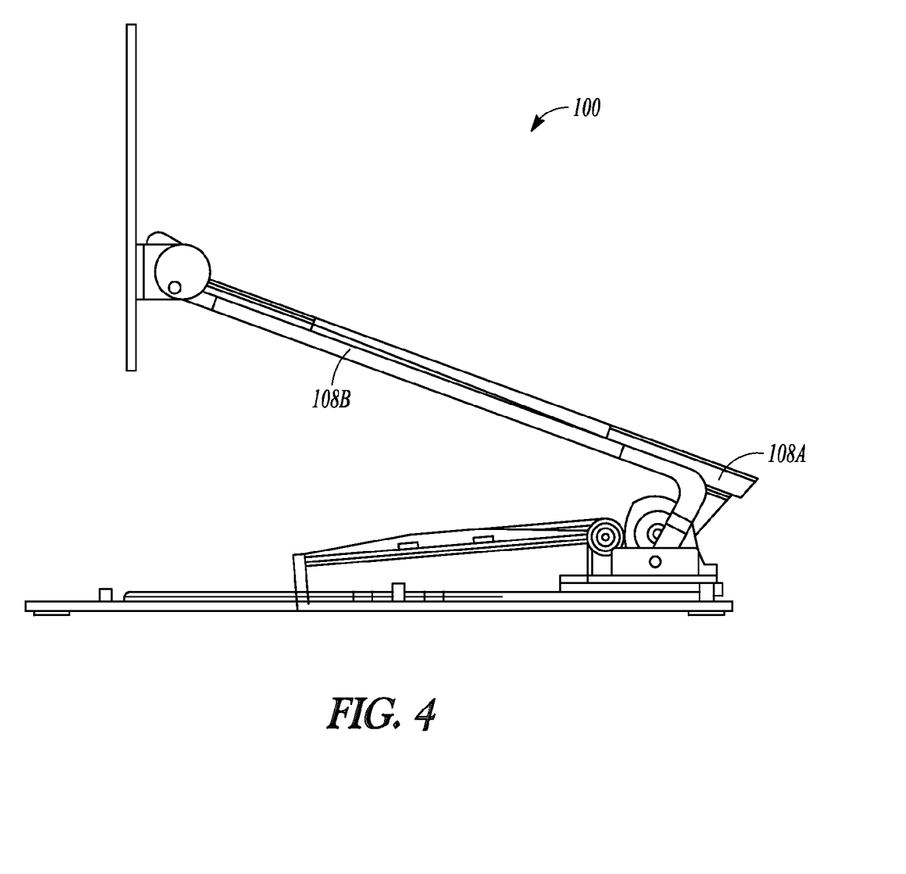
FIG. 4 is a side view of a lift stand with arms in a lowered position, according to an embodiment of the invention.

FIG. 4 is a side view of a lift stand 100 with the decorative skins removed and the arms 108 in a lowered position, according to an embodiment of the invention. In some examples (not depicted), the arms 108 can be lowered below horizontal such that in the lowered position, a top of the arms 108 adjacent the display bracket is positioned below a bottom of the arms 108.

Figure 5:
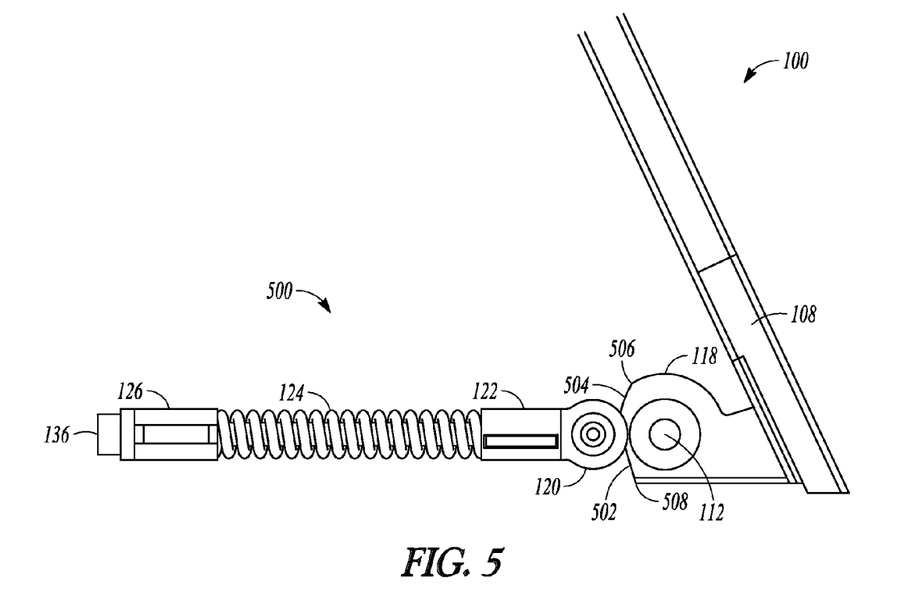
FIG. 5 is a detailed side view of the lift mechanism in the raised position, according to an embodiment of the invention.

FIG. 5 is a detailed side view of the lift mechanism 500 with the arms 108 of the lift stand 100 in the raised position, according to an embodiment of the invention. The lift mechanism 500 can include a cam follower holding bracket 122, a bias element holding bracket 126, and a bias element 124 supported therebetween. The cam follower holding bracket 122 and the bias element holding bracket 126 can be slidably coupled to a bias element guide 128 and guide bracket 132. One or more cam followers 120 can be supported by the cam follower holding bracket 122, such that the cam follower 120 applies force to the cam surface 118. In an example, the cam surface 118 can be coupled to or integrated within the one or more arms 108 (e.g., upper arm 108a).

The amount of force applied to the cam surface 118 by the cam follower 120 can be configurable, such as by an adjustment element 136. The adjustment element 136 can configure the force exerted by the bias element 124 (e.g., by adjusting the compression of a spring). The lift mechanism 500 can provide counterbalance assistance to a user repositioning the display height, such as to allow for adjusting the height of a display with a low amount of user effort.

The weight of the display, display bracket 102, linkage 106 (not shown), and arms 108, generate a moment of force (load moment) about the one or more base hinges (e.g., upper base hinge 112). The load moment acts in a direction that can lower the display mounting bracket 102 if not supported. The lift mechanism 500 can generate a moment of force equal to or greater than necessary to maintain the position of the display. In an example, the lift mechanism 500 can apply a moment of force (e.g., equal but opposite to the load moment) to one or more of the arms 108. The moment of force required to maintain the position of the display can depend on the height of the display. For example, according to the example shown in FIG. 5, the load moment can be highest if the lift stand 100 is in the lowered position. In contrast, the load moment can be lowest if the lift stand 100 is in the raised position.

The cam surface 118 can be configured with a profile that engages the cam follower 120. The bias element 124 exerts a force onto the cam surface 118 through the cam follower holding bracket 122 and the cam follower 120. The amount of force applied to the cam surface 118 can be configured by the adjustment element 136. The profile of the cam surface 118 can be configured to direct a predetermined magnitude of force generated from the bias element 124, such as to produce the desired moment of force about the upper base hinge 112.

In an example, the cam surface 118 can have a variable radius (e.g., a distance from the center of the hinge 112 to the cam surface 118), such as to generate a different moment of force depending upon the position of the one or more arms 108. A large radius section 504 of the cam surface 118 can generate a greater moment of force about the base hinge (e.g., upper base hinge 112). Likewise a small radius section 502 of cam surface 118 can result in a lower force than is generated by the larger radius section 504, such as to generate the moment of force necessary to maintain the display in the raised position as shown in FIG. 5.

The cam surface 118 can have a profile that is configured with any number of curvatures and radii between a first cam surface end 506 (e.g., a large radius section 504) and a second cam surface end 508 (e.g., with a small radius 502). The profile of the cam surface 118 can be configured to create a moment of force about the base hinge (e.g., upper base hinge 112) that is equal but opposite the load moment, such as at every height position of the display mounting bracket 102. The display mounted to the lift stand 100 can be positioned at an infinite number of heights between the raised and lowered position. The cam surface 118 can be configured so the force from the bias element 124 can remain constant during the use of the lift stand 100, such as eliminating the need to tune the adjustment element 136 if the weight of the display remains constant.

Figure 6:
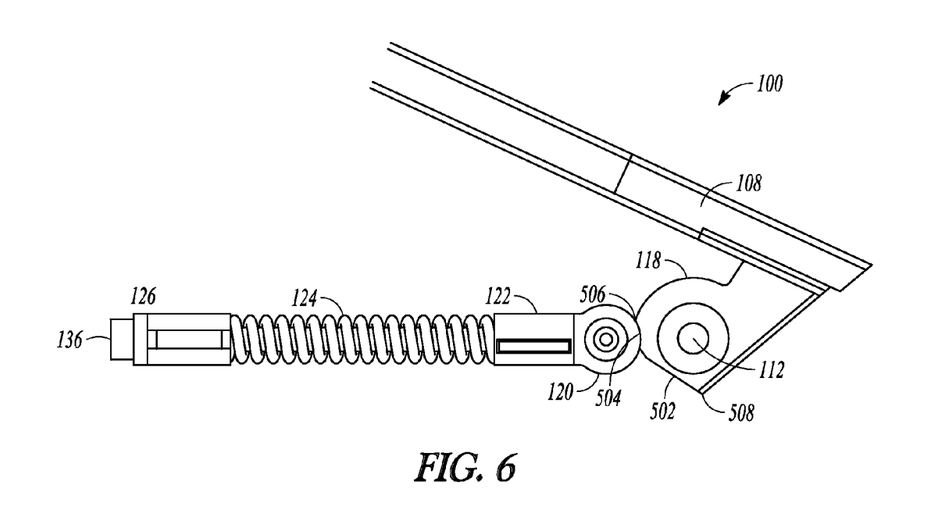
FIG. 6 is a detailed side view of the lift mechanism in the lowered position, according to an embodiment of the invention.

FIG. 6 is a detailed side view of the lift mechanism 500 with the arms 108 of the lift stand 100 in the lowered position, according to an embodiment of the invention. The cam follower 120 can apply force to a first cam surface end 506, such as when the one or more arms 108 are located in the lowered position. The cam surface 118 can be configured to have a large radius section 504 at the first cam surface end 506 as shown in FIG. 6. As a result of the profile at the first cam surface end 506, the display can be maintained in a lowered position. In an example, no adjustment is required to the bias element 124 (e.g., via the adjustment element 136) in order to maintain the display in the lowered position.

Figure 7:
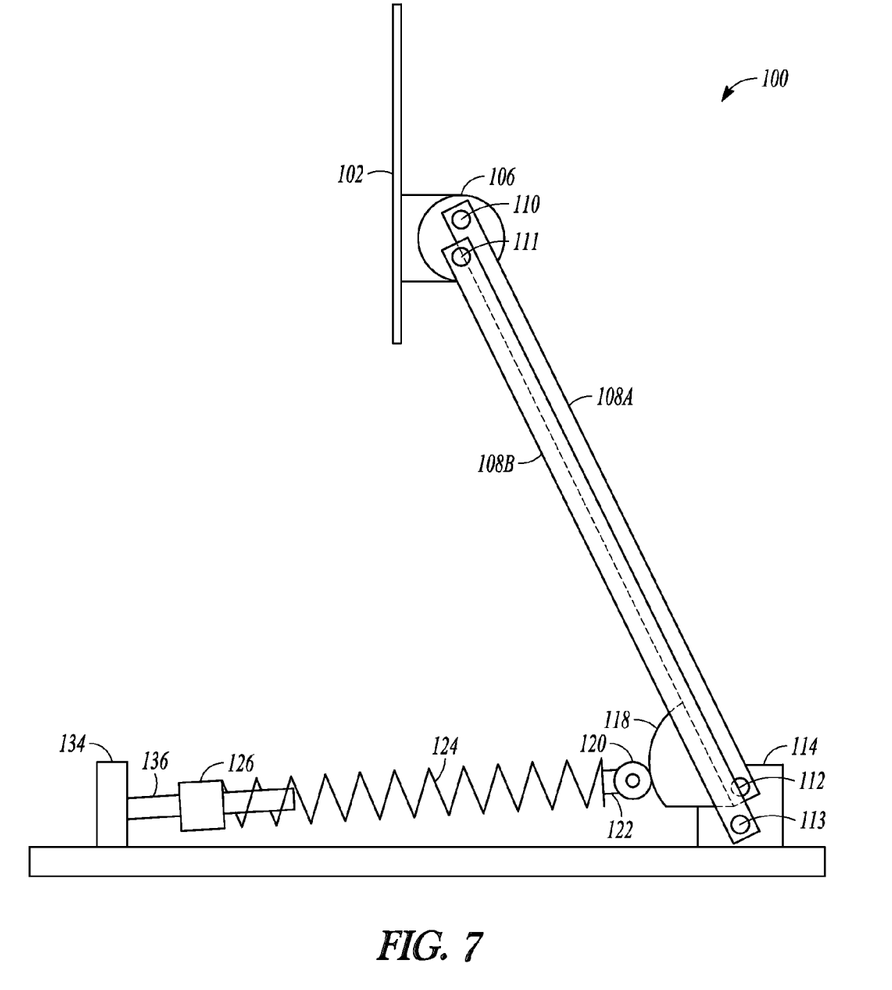
FIG. 7 is a simplified view of the side of a lift mechanism in the raised position, according to an embodiment of the invention.

FIG. 7 is a simplified view of the side of the linkage 106, arms 108, and lift mechanism 500 in the raised position, according to an embodiment of the invention. The linkage 106 can be configured as a structure for supporting the display bracket 102. The display bracket 102 can be fixably attached to the linkage 106, such as by welding or fastening. In an example, the display bracket 102 can be hingedly attached to the linkage 106, such as to allow the orientation of the display bracket 102 to be modified in relation to the linkage 106. One or more arms 108 can be coupled to the base 104. The linkage 106 is suspended above the base 104 by the one or more arms 108.

The linkage 106 can include an upper linkage hinge 110 and a lower linkage hinge 111. One or more of the arms 108 can be coupled to the upper linkage hinge 110, such as an upper arm 108a. One or more lower arms 108b can be coupled to the lower linkage hinge 111. Likewise, the arms 108 can be coupled to the base 104 (e.g., via the base hinge bracket 114) by a hinge or otherwise articulated joint. The one or more upper arms 108a can be coupled to one or more upper base hinges 112, and the one or more lower arms 108b can be coupled to one or more lower base hinges 113.

The linkage 106 maintains the same orientation, regardless of the height position of the display. The coupling of the arms 108 to the base 104 and the linkage 106 can be configured to maintain the orientation of the linkage 106 relative to the base 104. In an example, the upper linkage hinge 110 and the lower linkage hinge 111 can have the same relative position as the upper base hinge 112 and the lower base hinge 113. In this configuration, the linkage 106 can pivot at the same rate, but opposite direction of the arms 108; thus, maintaining the orientation of the linkage 106 to the base 104 regardless of the display height set by the user.

In an example, the lift stand 100 can include two upper arms 108a and two lower arms 108b. Additionally or alternatively, the upper arms 108a or lower arms 108b can be integrated together so long as no upper arm 108a is coupled to any lower arm 108b.

Figure 8:
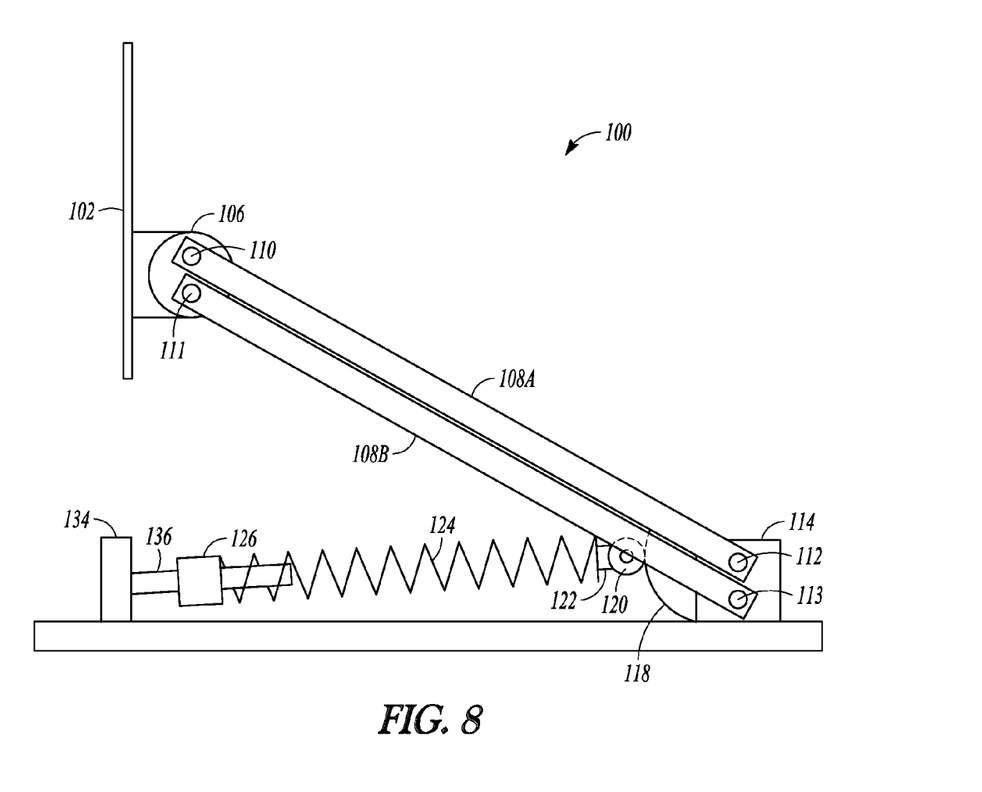
FIG. 8 is a simplified view of the side of a lift mechanism in the lowered position, according to an embodiment of the invention.

FIG. 8 is a simplified side view of the lift mechanism 500 in the lowered position, according to an embodiment of the invention. In the lowered position, the orientation of the display bracket 102 and linkage 106 are in the same orientation as if they were in the raised position (shown in FIG. 7) or any other position therebetween.

Figure 9:
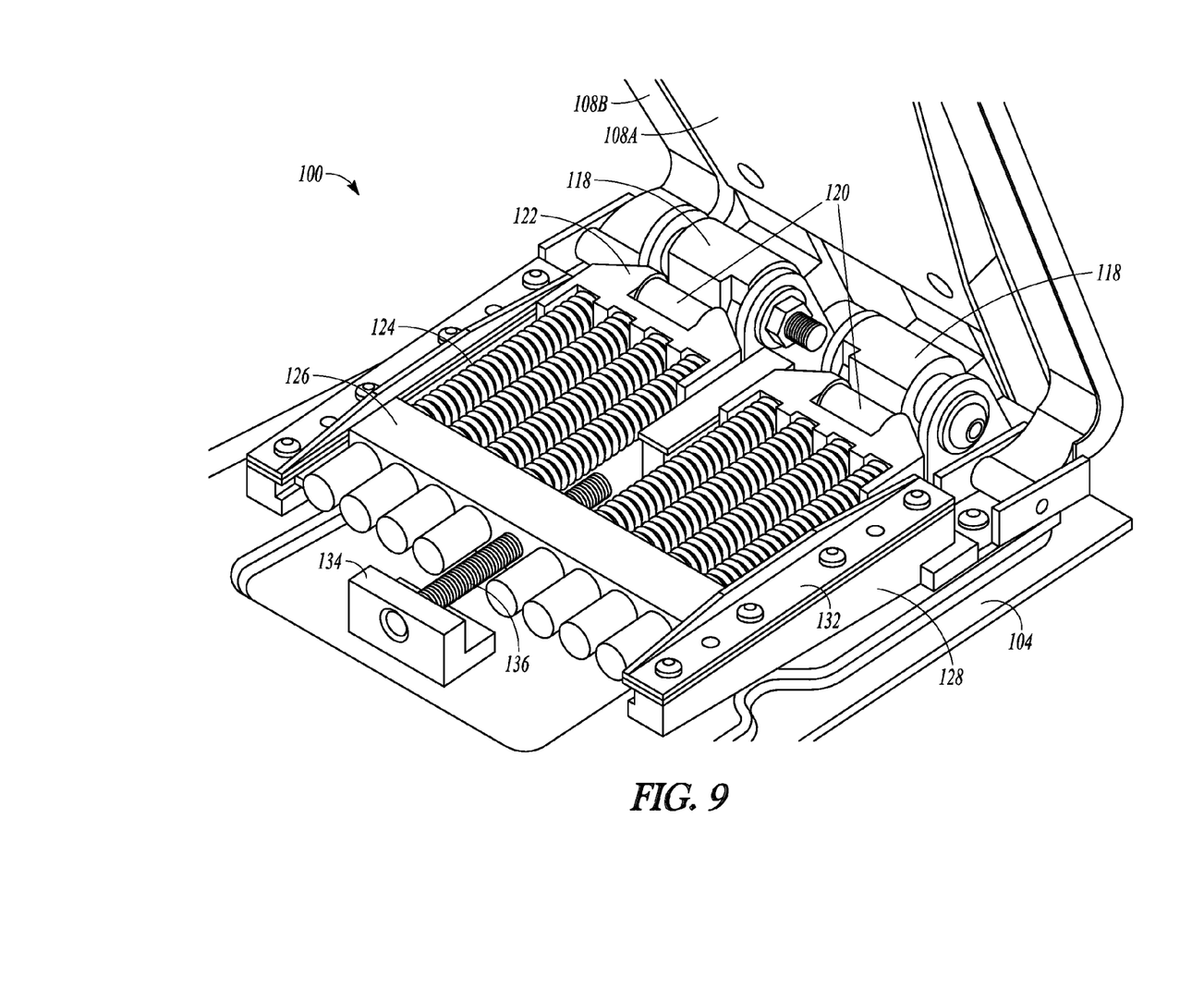
FIG. 9 is a perspective view of the lift mechanism, according to one embodiment of the invention.

FIG. 9 is a perspective view of the lift mechanism 500, according to one embodiment of the invention. The photo shows an example of the lift stand 100. The upper arms 108a are integrated into a single upper arm 108a as shown. Two lower arms 108b can be seen on either side of the upper arm 108a. The cam surface 118 can be directly integrated into the upper arm 108a, such as by machining or casting the upper arm 108a and the cam surface 118 from the same piece of material. In the example shown, the cam followers 120 are roller bearings supported by the cam follower holding bracket 122 and the bias element 124 is a coiled compression spring. The bias element holding bracket 126 can be repositioned with respect to the cam follower holding bracket 122 by rotating the adjustment element 136 (e.g., a set screw). The adjustment element 136 can be threaded into the bias element holding bracket 126 on one end and supported by the mounting bracket 134 on the other. The bias element holding bracket 126 and cam follower holding bracket 122 are slidably coupled between the bias element guide 128 and the guide bracket 132.

Figure 10:
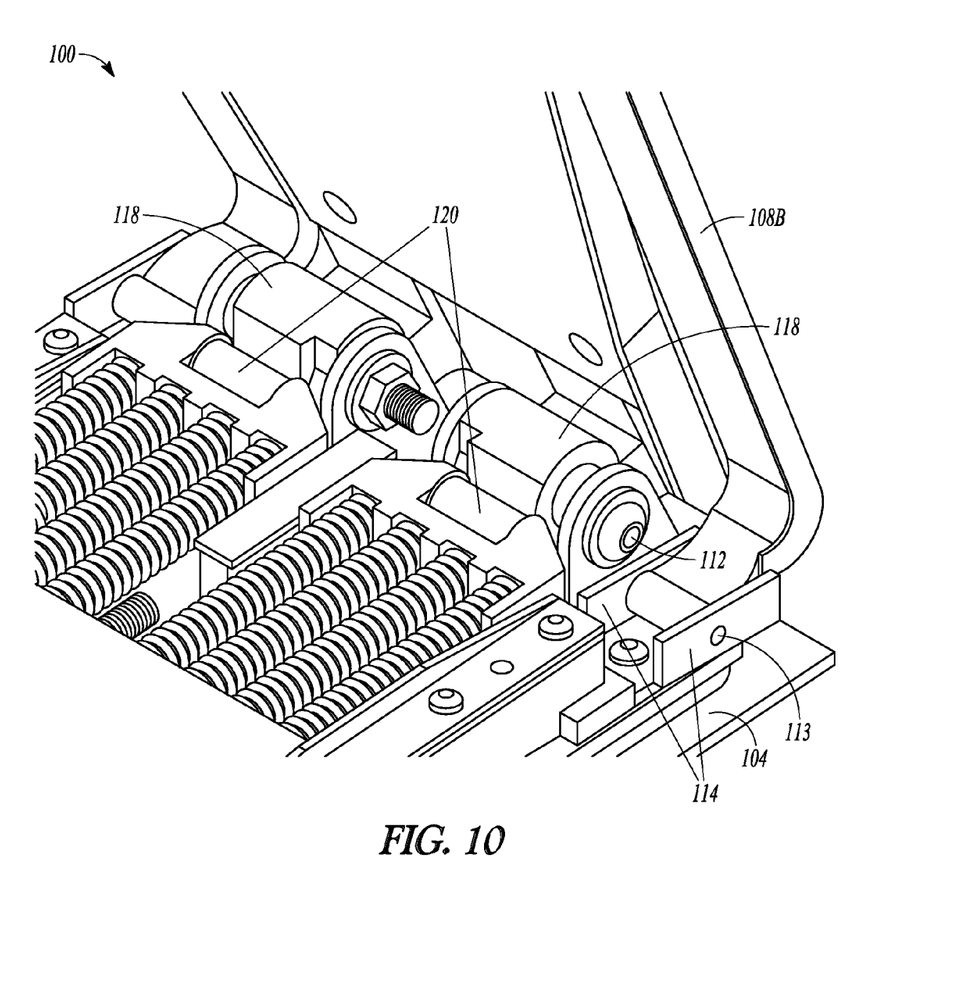
FIG. 10 is a side-perspective view of the lift mechanism, according to one embodiment of the invention.

FIG. 10 is a side-perspective view of the lift mechanism 500, according to one embodiment of the invention. In this example, the upper arm 108a can be coupled to a base hinge bracket 114 by way of an upper base hinge 112 (e.g., a bolt as shown). The lower arms 108b are shown as coupled to the base hinge bracket 114, such as by a press-fit hinge.

Various Notes and Examples

Example 1 includes subject matter (such as a device, apparatus, or machine) comprising: a bracket configured to support an object; a support having a first end and a second end, the first end being movably engaged to the bracket; at least one cam engaged to the second end of the support; and a base including: a cam follower configured to engage the at least one cam; and at least one bias element having a first end and a second end, the first end engaged to the cam follower.

In Example 2, the subject matter of Example 1 may include, wherein the support includes a four-bar arm mechanism.

In Example 3, the subject matter of one or more of Examples 1 to 2 may include, wherein the at least one bias element is a spring.

In Example 4, the subject matter of one or more of Examples 1 to 3 may include, a bias element holding bracket configured to engage the second end of the at least one bias element; and an adjustment element configured to engage the bias element holding bracket.

In Example 5, the subject matter of one or more of Examples 1 to 4 may include, wherein the object is an electronic display.

In Example 6, the subject matter of one or more of Examples 1 to 5 may include, wherein the at least one cam engaged to the second end of the support is incorporated into the support.

In Example 7, the subject matter of one or more of Examples 1 to 6 may include, wherein the bracket is a plate.

Example 8 includes subject matter (such as a device, apparatus, or machine) comprising: a bracket configured to support an object; a support having a first end and a second end, the first end being movably engaged to the bracket; a first cam and a second cam, the first and second cams engaged to the second end of the support; and a base including: a first cam follower configured to engage the first cam; a second cam follower configured to engage the second cam; at least one first bias element having a first end and a second end, the first end engaged to the first cam follower; and at least one second bias element having a first end and a second end, the first end engaged to the second cam follower.

In Example 9, the subject matter of Example 8 may include, wherein the support includes a four-bar arm mechanism.

In Example 10, the subject matter of one or more of Examples 8 to 9 may include, wherein the at least one first bias element is at least one first spring, and wherein the at least one second bias element is at least one second spring.

In Example 11, the subject matter of one or more of Examples 8 to 10 may include, wherein the base further comprises: a bias element holding bracket configured to engage the second end of the at least one first bias element and the second end of the at least one second bias element; and an adjustment element configured to engage the bias element holding bracket.

In Example 12, the subject matter of one or more of Examples 8 to 11 may include, wherein the object is an electronic display.

In Example 13, the subject matter of one or more of Examples 8 to 12 may include, wherein the first cam engaged to the second end of the support and the second cam engaged to the second end of the support are incorporated into the support.

Example 14 includes subject matter (such as a device, apparatus, or machine) comprising: a bracket configured to support an object; a four-bar arm mechanism having a first end and a second end, the first end being movably engaged to the bracket; a first cam and a second cam, the first and second cams engaged to the second end of the four-bar arm mechanism; and a base including: a first cam follower configured to engage the first cam; a second cam follower configured to engage the second cam; a first holder configured to support the first cam follower; a second holder configured to support the second cam follower; a first plurality of springs, the first plurality of springs having a first end and second end, the first end engaged to the first holder; a second plurality of springs, the second plurality of springs having a first end and second end, the first end engaged to the second holder; a bias element holding bracket configured to engage the second end of the first plurality of spring and the second end of the second plurality of springs; and an adjustment element configured to engage the bias element holding bracket.

In Example 15, the subject matter of Example 14 may include, wherein the object is an electronic display.

In Example 16, the subject matter of one or more of Examples 14 to 15 may include, wherein the first and second cams engaged to the second end of the four-bar arm mechanism are incorporated into the support.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to within this specification as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described within this specification.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A lift system comprising:
    a bracket configured to support an object;
    a four-bar arm mechanism having a first end and a second end, the first end being movably engaged to the bracket;
    at least one cam engaged to the second end of the four-bar arm mechanism; and
    a base including:
        a cam follower configured to engage the at least one cam and move laterally in response to rotation of the at least one cam; and
        at least one bias element having a first end and a second end, the first end engaged to the cam follower.

2. The lift system of claim 1, wherein the at least one bias element is a spring.

3. The lift system of claim 1, comprising:
    a bias element holding bracket configured to engage the second end of the at least one bias element; and
    an adjustment element configured to engage the bias element holding bracket.

4. The lift system of claim 1, wherein the object is an electronic display.

5. The lift system of claim 1, wherein the at least one cam engaged to the second end of the four-bar arm mechanism is incorporated into the four-bar arm mechanism.

6. The lift system of claim 1, wherein the bracket is a plate.

7. A lift system comprising:
    a bracket configured to support an object;
    a four-bar arm mechanism having a first end and a second end, the first end being movably engaged to the bracket;
    a first cam and a second cam, the first and second cams engaged to the second end of the four-bar arm mechanism; and
    a base including:
        a first cam follower configured to engage the first cam and move laterally in response to rotation of the first cam;

a second cam follower configured to engage the second cam and move laterally in response to rotation of the second cam;

at least one first bias element having a first end and a second end, the first end engaged to the first cam follower; and at least one second bias element having a first end and a second end, the first end engaged to the second cam follower.

8. The lift system of claim 7, wherein the at least one first bias element is at least one first spring, and wherein the at least one second bias element is at least one second spring.

9. The lift system of claim 7, wherein the base further comprises:

a bias element holding bracket configured to engage the second end of the at least one first bias element and the second end of the at least one second bias element; and an adjustment element configured to engage the bias element holding bracket.

10. The lift system of claim 7, wherein the object is an electronic display.

11. The lift system of claim 7, wherein the first cam engaged to the second end of the four-bar arm mechanism and the second cam engaged to the second end of the four-bar arm mechanism are incorporated into the four-bar arm mechanism.

12. A lift system comprising:

a bracket configured to support an object;

a four-bar arm mechanism having a first end and a second end; the first end being movably engaged to the bracket;

a first cam and a second cam, the first and second cams engaged to the second end of the four-bar arm mechanism; and a base including:

a first cam follower configured to engage the first cam and move laterally in response to rotation of the first cam;

a second cam follower configured to engage the second cam and move laterally in response to rotation of the second cam;

a first holder configured to support the first cam follower;

a second holder configured to support the second cam follower;

a first plurality of springs, the first plurality of springs having a first end and second end, the first end engaged to the first holder;

a second plurality of springs, the second plurality of springs having a first end and second end, the first end engaged to the second holder;

a bias element holding bracket configured to engage the second end of the first plurality of spring and the second end of the second plurality of springs; and an adjustment element configured to engage the bias element holding bracket.

13. The lift system of claim 12, wherein the object is an electronic display.

14. The lift system of claim 12, wherein the first and second cams engaged to the second end of the four-bar arm mechanism are incorporated into the four-bar arm mechanism.

* * * * *